Figure 1:
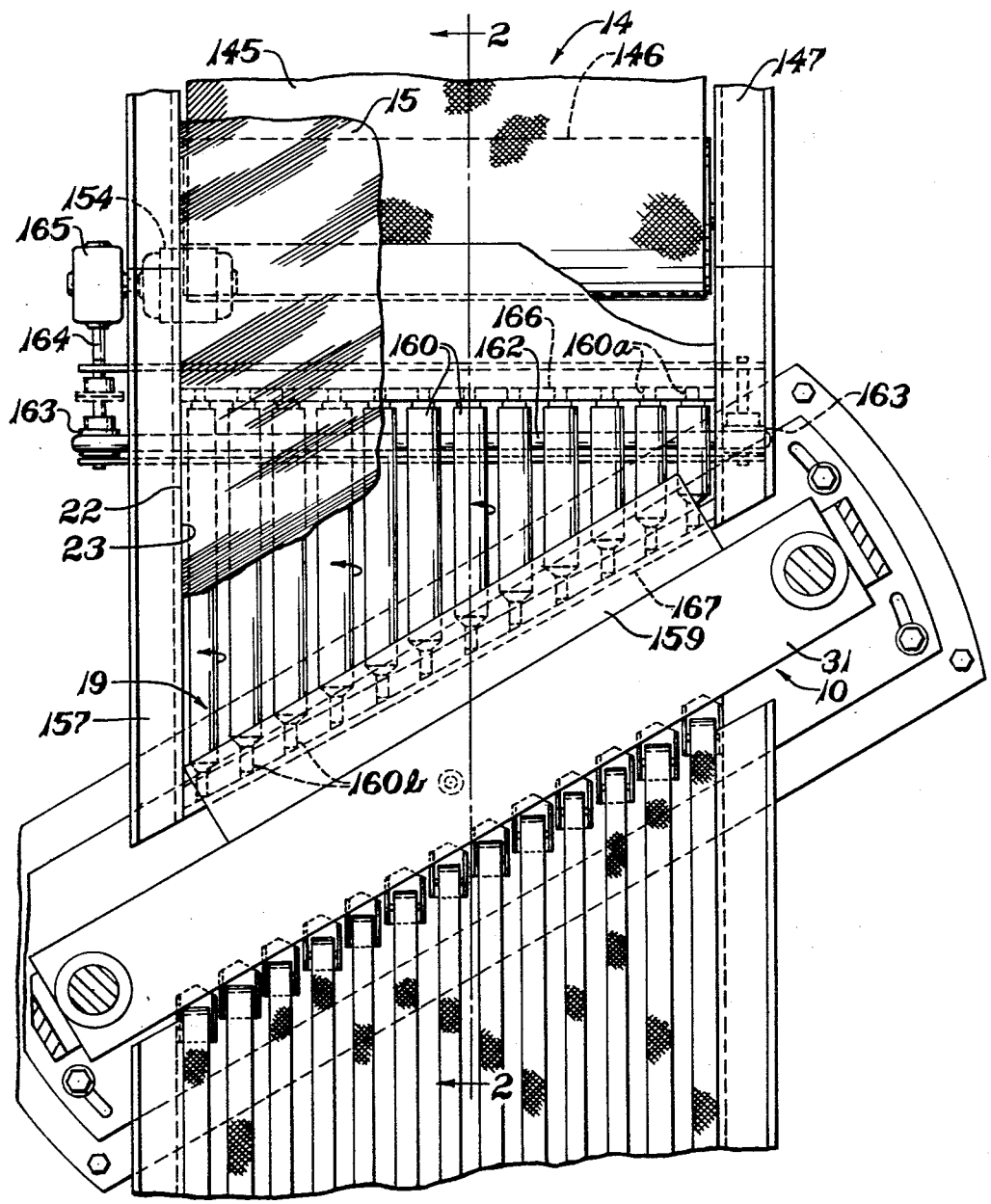

Aug. 4, 1964 V. H. HASSELQUIST 3,143,343
FABRIC ALIGNMENT APPARATUS
Original Filed July 17, 1956 2 Sheets-Sheet 1

INVENTOR.
VICTOR H. HASSELQUIST
BY
William L. Reeig
ATTY.

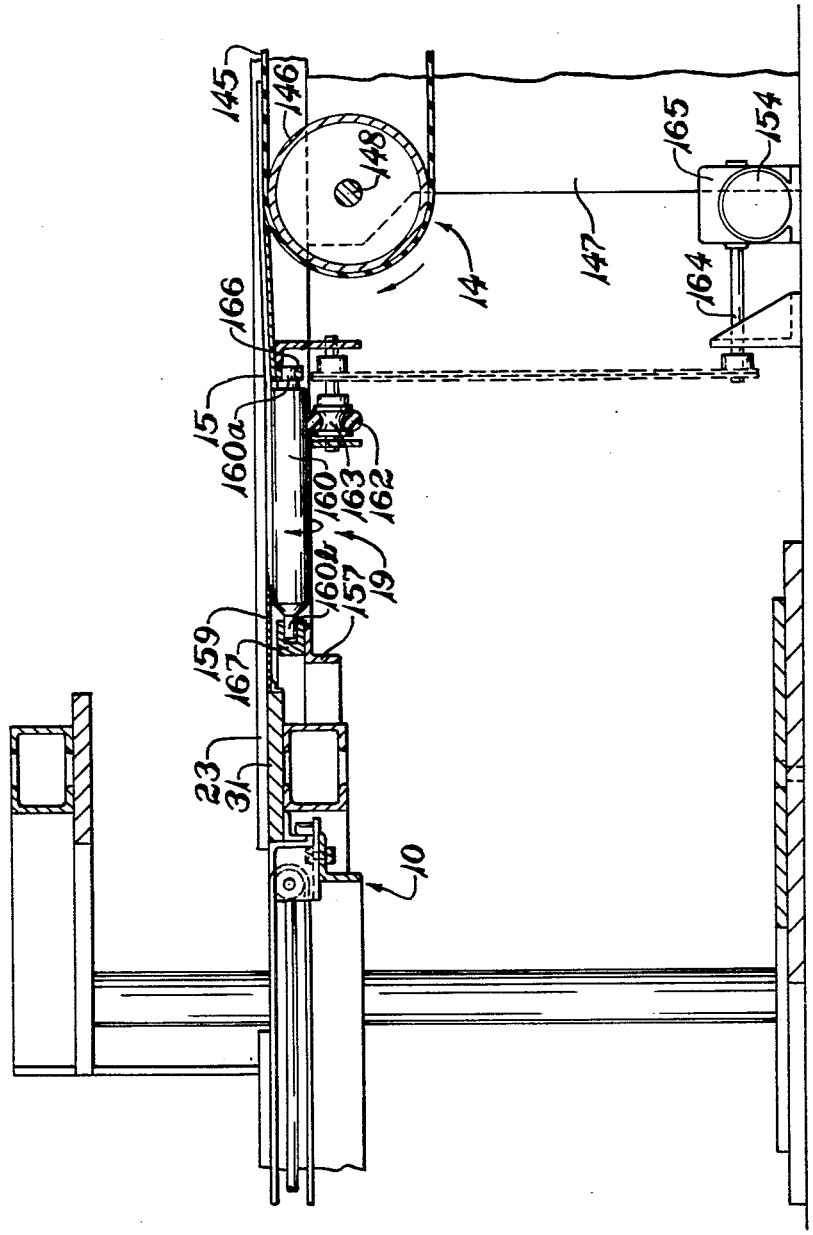

United States Patent Office 3,143,343
Patented Aug. 4, 1964

3,143,343
FABRIC ALIGNMENT APPARATUS
Victor H. Hasselquist, Akron, Ohio, assignor to The B. F. Goodrich Company, New York, N.Y., a corporation of New York
Original application July 17, 1956, Ser. No. 598,313, now Patent No. 3,130,100, dated Apr. 21, 1964. Divided and this application Nov. 30, 1961, Ser. No. 156,060
2 Claims. (Cl. 271—59)

This invention relates to apparatus for aligning fabric sheet material as it is conveyed in the direction of its length. The present application is a division of a copending application, Serial No. 598,313, filed July 17, 1956, now U.S. Patent No. 3,130,100, which discloses a system for splicing fabric sheet material, such as bias cut pieces of elastomeric tire cord stock, into a continuous strip. The equipment used in such a splicing system includes an alignment apparatus made according to the present invention for aligning spliced pieces of tire cord fabric as they are drawn from the splicing mechanism by a takeoff conveyor.

The edge alignment apparatus of this invention is characterized in that it has material engaging elements which act without distorting, warping or otherwise disturbing such material. Accordingly, even though the spliced strip of sheet material may be misaligned when it emanates from the splicing mechanism, by the time it reaches the material takeoff conveyor it is in positive alignment with the preceding increments of said strip being transported by the takeoff conveyor.

The tire cord fabric splicing system described in parent application Serial No. 598,313 is an example of a system in which this invention may be advantageously used. The tire cord fabric is bias cut at one location and the cut pieces are then transferred in succession to a splicer mechanism by suitable conveying means. At times, the individual pieces of bias cut cord fabric are not properly aligned longitudinally in passing through the splicing mechanism so that they continue to be misaligned as they are conveyed from the splicing mechanism in the form of a continuous strip. Therefore, the transporting of this strip over and upon the alignment apparatus of the present invention causes it to become perfectly aligned with preceding increments of the strip for proper feeding to subsequent fabric winding machines or article building apparatus.

According to the invention, the alignment apparatus in its presently preferred embodiment includes one or more axially parallel and coplanar rolls having their axes extending in a direction parallel to the direction of travel of said spliced strip of cord fabric, each such roll having a polished, cylindrical, material engaging surface. Means are also provided whereby each such roll is rotated in the same direction about its longitudinal axis to urge said strip, while moving in the direction of its length, over said rolls, laterally sideways against an adjustably positioned strip edge guide.

The invention will be further described with reference to the accompanying drawings, forming a part of this application, in which one preferred conveyor system embodying this invention is illustrated. The conveyor system selected for illustration is particularly adapted for conveying a strip of spliced bias cut pieces of tire cord fabric from a splicing mechanism.

FIG. 1 is a plan view of the alignment apparatus in association with a splicing mechanism and a material takeoff conveyor; and FIG. 2 is a side elevational view of the alignment apparatus, partially in section, taken along the line 2—2 of FIG. 1, showing how the alignment rolls of the apparatus are mounted and driven.

Referring to FIG. 1, an alignment apparatus according to this invention is installed as a fabric edge alignment apron 19 between the exit side of a fabric edge splicer 10, and the receiving end of a takeoff conveyor 14. The takeoff conveyor 14 advances a continuous length of elastomeric cord fabric 15, formed from individual pieces of bias cut cord fabric which have been butt spliced edge to edge by the splicer 10, over the alignment apron 19. The conveyor 14 and the apron 19 each include a longitudinal guide rail 23 disposed along one side thereof against which one of the bias cut edges 22 of the fabric is positioned by the alignment apron as the fabric is moved away from the splicer 10.

The takeoff conveyor 14 comprises a flexible belt 145, only the rear portion of which is shown in the drawings, trained about a tail roll 146 supported on a shaft 148 which is journalled at its ends on the main conveyor frame members 147 located on opposite sides of the conveyor. The belt 145 is driven at its feed end, not shown.

The alignment apron 19 is located between the splicing table 131 and the takeoff belt 145 and includes a generally trapezoidal rigid frame 157 which is secured to the main frame 147 of the takeoff conveyor 14 and projects therefrom in cantilever fashion toward the table 31. The side of apron 19 adjacent the splicer 10 is covered with a horizontal, sheet metal flashing 159 which is secured to the splicing table 31 thereby bridging the gap between the apron 19 and the table 31. The portion of flashing 159 overlying the end of the apron 19 is positioned just above the apron so that the table 31 and the flashing carried thereby may be angularly adjusted relative to the apron.

The apron 19 includes a series of coplanar rollers 160 supported by the apron frame 157 for rotation on axes parallel to the edge guide rail 23. Each roller 160 is supported for free rotation by means of its front arbors 160a and rear arbors 160b in front and rear journal bars 166 and 167 respectively. While they are supported for free rotation, the rollers are preferably slowly rotated at the same speed, during fabric removal operations, in a direction to urge the strip of spliced fabric 15 upon the apron 19 laterally toward the upstanding guide rail 23, against which the cut edges 22 of the fabric pieces become aligned. In this preferred embodiment, the rollers are rotated by means of a small flexible belt 162 which extends transversely below the apron 19 tangentially engaging the underside of the rollers 160. Belt 162, which may be an ordinary power transmission belt, is trained about pulleys 163 at opposite sides of the apron 19 and may be driven by a shaft 164 connected through an appropriate gear reduction unit 165 to a drive motor 154.

The rollers 160 are of varying lengths corresponding to the trapezoid shape of the frame 157. This variation in roll length has an additional benefit which is not readily apparent. It will be seen that the longest of the roller exerting the greatest force on the undersurface of rollers 160, and thus the roller exerting the greatest force on the undersurface of the fabric 15, is that situated immediately adjacent the upstanding edge guide rail 23. The force exerted by each roller progressively farther from the rail 23 is lessened in proportion to its length when the rollers 160 are rotated at the same speed because of the reduced amount of contact between the shorter rollers 160 and fabric 15. Therefore, the rolls exert greatest force nearest the rail 23 tending to pull rather than push the fabric 15, resulting in freedom from wrinkles and other unwanted distortions in the fabric which are commonly encountered when it is pushed rather than drawn. The rollers 160 have a smoothly polished, fabric engaging surface which can slide relative to the fabric 15 when the fabric abuts guide rail 23, thus overcoming the possibility of the rollers wrinkling the fabric.

While this invention has been described with reference to a specific embodiment, changes and modifications within the scope of the invention as set forth in the appended claims will be readily apparent to those skilled in the art to which it pertains.

I claim:

1. Apparatus for aligning a strip of elastomeric cord fabric as said fabric is moved in the direction of its length; comprising a plurality of rotatable, laterally spaced, cylindrical, fabric engaging rolls disposed in a horizontal plane axially parallel to the direction of the length of said strip, said rolls having progressively decreasing length in the order of their position away from the side of the apparatus nearest the edge guide means to the opposite side; edge guide means disposed parallel to the axes of said rolls; and means to jointly rotate said rolls whereby the fabric engaging portions thereof move in a direction to urge said fabric against said edge guide means.

2. Apparatus as described in claim 1, wherein said rolls are smoothly polished whereby they rotatably slide relative to said fabric supported thereby when said fabric is in contact with said edge guide means.

References Cited in the file of this patent

UNITED STATES PATENTS

| | | |
|---|---|---|
| 1,626,352 | Olson | Apr. 26, 1927 |
| 1,954,278 | Adams | Apr. 10, 1934 |
| 2,130,330 | Sibley | Sept. 13, 1938 |
| 2,487,149 | Leguillon | Nov. 8, 1949 |
| 2,940,506 | McKee et al. | June 14, 1960 |
| 3,036,691 | Byrnes | May 29, 1962 |